United States Patent
Bryant et al.

(10) Patent No.: US 9,921,743 B2
(45) Date of Patent: Mar. 20, 2018

(54) WET FINGER TRACKING ON CAPACITIVE TOUCHSCREENS

(71) Applicant: International Business Machines Corporation, Armonk, NY (US)

(72) Inventors: Jay S. Bryant, Rochester, MN (US); James E. Carey, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/831,714

(22) Filed: Aug. 20, 2015

(65) Prior Publication Data
US 2017/0052625 A1    Feb. 23, 2017

(51) Int. Cl.
*G06F 3/0488* (2013.01)
*G06F 3/041* (2006.01)
*G06F 3/044* (2006.01)

(52) U.S. Cl.
CPC ........ *G06F 3/04883* (2013.01); *G06F 3/0418* (2013.01); *G06F 3/044* (2013.01)

(58) Field of Classification Search
CPC ..... G06F 3/0418; G06F 3/044; G06F 3/04883
USPC .................................................. 345/170–176
See application file for complete search history.

(56) References Cited

U.S. PATENT DOCUMENTS

| | | | |
|---|---|---|---|
| 8,237,657 B2 | 8/2012 | Liberty et al. | |
| 8,407,606 B1* | 3/2013 | Davidson | G06F 3/0488 345/173 |
| 8,773,146 B1 | 7/2014 | Hills et al. | |
| 8,982,097 B1* | 3/2015 | Kuzo | G06F 3/0418 345/174 |
| 2009/0229892 A1* | 9/2009 | Fisher | G06F 1/1626 178/18.03 |
| 2009/0256817 A1* | 10/2009 | Perlin | G06F 3/0233 345/174 |
| 2010/0007631 A1* | 1/2010 | Chang | G06F 3/044 345/174 |
| 2011/0193809 A1 | 8/2011 | Walley et al. | |
| 2011/0210944 A1* | 9/2011 | Chen | G06F 3/0418 345/174 |
| 2012/0050214 A1* | 3/2012 | Kremin | G06F 3/0418 345/174 |
| 2012/0062510 A1* | 3/2012 | Mo | G06F 3/044 345/174 |
| 2012/0268411 A1* | 10/2012 | Chen | G06F 3/044 345/174 |

(Continued)

OTHER PUBLICATIONS

Vikas Dhurka; "Touchscreen Requirements for Human Machine Interface in Industrial Automation"; Mon, Apr. 22, 2013—11:43am; http://www.wirelessdesignmag.com/articles/2013/04/touchscreen-requir . . . .

(Continued)

*Primary Examiner* — Tony Davis
(74) *Attorney, Agent, or Firm* — Patterson + Sheridan, LLP

(57) ABSTRACT

Techniques are presented for detection of a false touch on a touchscreen. The method includes recognizing a multi-touch instruction sequence, determining whether the multi-touch instruction sequence includes at least a first touch component corresponding to a predicted false touch, and in response to determining there is a false touch, disabling multi-touch functionality for the multi-touch instruction sequence.

20 Claims, 8 Drawing Sheets

(56) References Cited

U.S. PATENT DOCUMENTS

| | | | | |
|---|---|---|---|---|
| 2013/0176268 A1* | 7/2013 | Li | ............................ | G06F 3/044 345/174 |
| 2013/0207905 A1* | 8/2013 | Hankins | .................. | G06F 3/041 345/173 |
| 2013/0207935 A1* | 8/2013 | Toda | ........................ | G06F 3/044 345/174 |
| 2013/0234978 A1* | 9/2013 | Ksondzyk | ............. | G06F 3/0418 345/174 |
| 2013/0241890 A1* | 9/2013 | Sharma | .................. | G06F 3/0426 345/175 |
| 2013/0278543 A1* | 10/2013 | Hsu | .......................... | G06F 3/044 345/174 |
| 2014/0002396 A1* | 1/2014 | Zhao | ........................ | G06F 3/041 345/173 |
| 2014/0104222 A1* | 4/2014 | Chang | ................... | G06F 3/0416 345/174 |
| 2014/0198064 A1 | 7/2014 | Kim et al. | | |
| 2014/0204058 A1* | 7/2014 | Huang | .................. | G06F 3/0418 345/174 |
| 2014/0282269 A1 | 9/2014 | Strutt et al. | | |
| 2014/0337786 A1 | 11/2014 | Luo | | |
| 2015/0186004 A1* | 7/2015 | Gordon | ................. | G06F 3/0488 345/173 |
| 2016/0283035 A1* | 9/2016 | Sandblad | ............... | G06F 3/0418 |

OTHER PUBLICATIONS

Cypress Perform; "Waterproofing Capacitive Touchscreens".

Electrical Engineering Stack Exchange; "Can a water drop do a "fake" touch on a capacitive touchscreen?"; http://electronics.stackexchange.com/questions/16439/can-a-water-drop- . . . .

Bits & Pieces from the Embedded Design World; "Does your smartphone's touchscreen support moisture touch?" Aug. 1, 2014; http://blog.atmel.com/2014/08/01/does-your-smartphones-touch-screen-s . . . .

Richard L. Zunkel; "4 Hand Geometry Based Verification"; Biometrics 1996, pp. 87-101.

\* cited by examiner

WET FINGER TRACKING ON CAPACITIVE TOUCHSCREENS

BACKGROUND

The present invention relates to improving wet finger tracking on a capacitive touchscreen, and more specifically, to methods to analyze patterns of touch on a touchscreen for the presence of liquid and interpret subsequent touches to improve performance on the touch screen.

A touchscreen is an electronic display sensing the location of a touch event within the display area. The touching may be done with a finger, but can also be done with passive objects such as a stylus. Touchscreens may be used in devices such as all-in-one computers, tablet computers, and smartphones. There are a variety of touchscreen technologies, such as resistive, capacitive, infrared, and the like.

Capacitive sensing is one of the more commonly used technologies for touchscreens. A capacitive touchscreen includes an insulator such as glass, coated with a transparent conductor, e.g. indium tin oxide. Touching the surface of the screen with a conductive object results in a distortion of the electrostatic field of the screen. The distortion of the electrostatic field on the screen can be measured by a change in capacitance.

A problem with capacitive sensing technologies in touchscreens is that the capacitive touchscreen cannot decipher between an active touch and false touch. For example, when water on the surface of the touchscreen registers as a touch because water is a conductive object. Subsequent attempts to use the touchscreen may be ignored or cause unpredictable multi-touch sequences. As touchscreens are being used in more locations and on more rugged devices, the presence of liquid on a touchscreen is becoming an increasingly important problem to solve.

SUMMARY

According to one embodiment of the present invention, a method of detecting a false touch on a touchscreen is disclosed herein. The method includes recognizing a multi-touch instruction sequence, determining whether the multi-touch instruction sequence includes at least a first touch component corresponding to a predicted false touch, and in response to determining there is a false touch, disabling multi-touch functionality for the multi-touch instruction sequence.

According to one embodiment of the present invention, a system is disclosed herein. The system includes a processor and a memory storing program code, which, when executed by the processor performs an operation for detecting a false touch on a touch screen. The operation includes recognizing a multi-touch instruction sequence, determining whether the multi-touch instruction sequence includes at least a first touch component corresponding to a predicted false touch, and in response to determining there is a false touch, disabling multi-touch functionality for the multi-touch instruction sequence.

According to one embodiment of the present invention, a computer program product for detecting a false touch on a touch screen is disclosed herein. The computer program product includes a computer-readable storage medium having computer-readable program code embodied therewith. The computer-readable program code includes computer-readable program code configured to recognize a multi-touch instruction sequence, computer-readable program code configured to determine whether the multi-touch instruction sequence includes at least a first touch component corresponding to a predicted false touch, and computer-readable program code configured to disable multi-touch functionality for the multi-touch instruction sequence, responsive to determining there is a false touch.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be adapted for use with other embodiments.

DETAILED DESCRIPTION

Embodiments presented herein provide techniques for detecting whether a false touch triggered a multi-touch instruction sequence. In one example, a capacitance detector recognizes a multi-touch instruction sequence based on changes in the capacitance of a touch screen. In response, a false touch detector determines whether a false touch is present in the multi-touch instruction sequence. The false touch detector may include a training module, a screen partition component, and a time analysis component. The training module component learns a user's patterns of interacting with the tablet. After learning such patterns, the false touch detector determines whether touches in a given multi-touch instruction sequence is consistent with the user's patterns. The screen partition partitions a touchscreen into regions based on the probability a user is likely to touch a given region. The screen partition component works with the capacitance detector and a tracking component to determine locations of the touches. Based on the determined locations, the false touch detector may predict whether a false touch is believed to have occurred. The time analysis component records the length of time that the capacitance detector detects the presence of a component of the multi-touch instruction sequence. The time analysis component compares this duration to a threshold. Based on this comparison, the false touch detector determines whether a component of the multi-touch sequence is predicted to be a false touch. Responsive to the false touch detector determining that a false touch occurred, a touchscreen controller disables multi-touch functionality for the multi-touch sequence detected.

Figure 1:
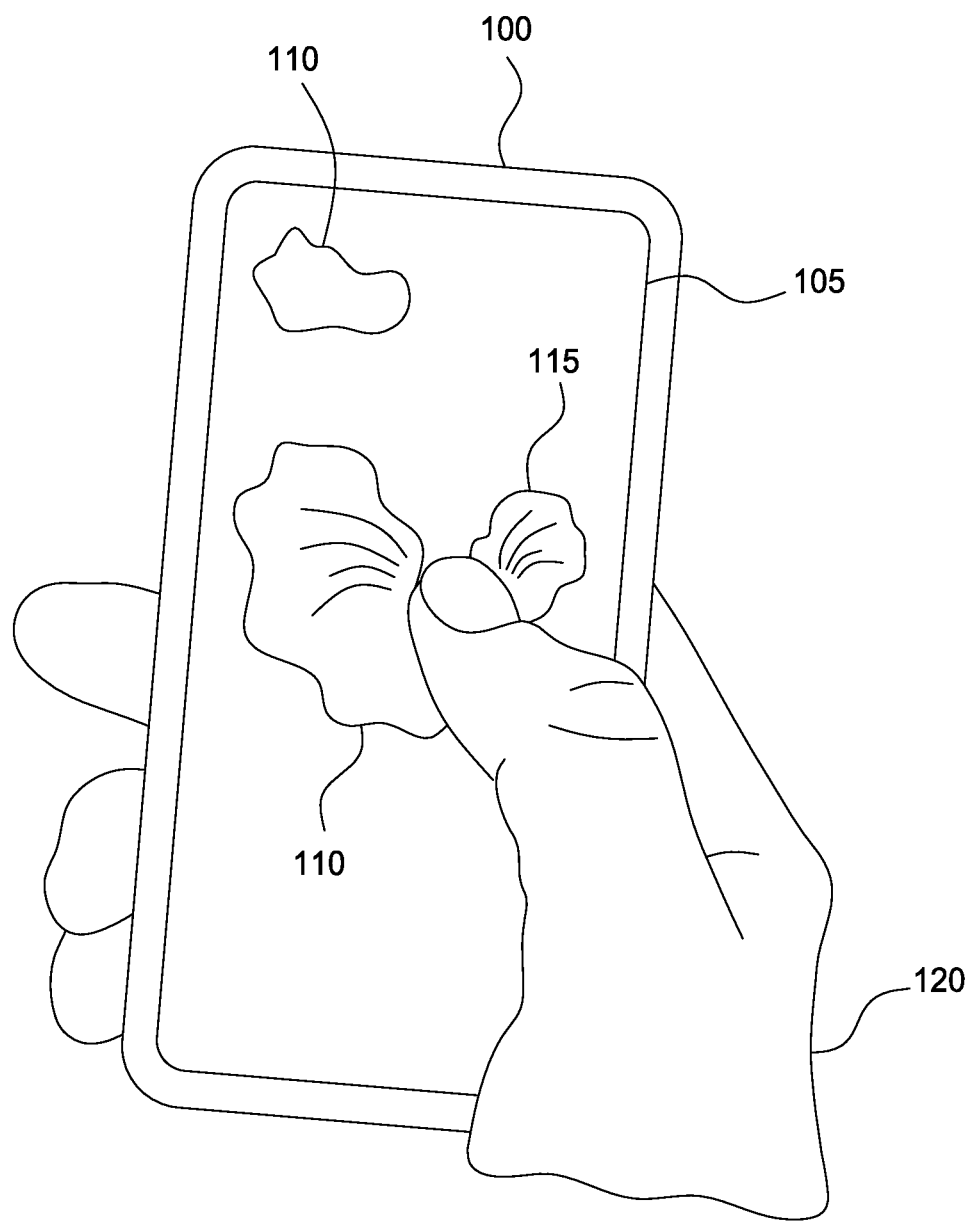
FIG. 1 illustrates a user using a tablet, according to one embodiment disclosed herein.

FIG. 1 illustrates an example of a user 100 using a tablet 105, according to one embodiment disclosed herein. Illustratively, the tablet 105 shown in FIG. 1 is a mobile device having a touchscreen 110. The touchscreen 110 is a capacitive touchscreen 110. The touchscreen 110 registers a touch when a capacitive object contacts the touchscreen 110. As the user 100 touches the touchscreen 110, the tablet 105 senses the user's 100 capacitance and records a touch. Additionally, the tablet 105 may recognize multi-touch functionality performed on the touchscreen 110. Multi-touch functionality allows the tablet 105 to process more than one touch from the user 100 at one time. For example, multi-touch functionality allows the tablet 105 to process actions, such as a user 100 swiping across the touchscreen 110 to unlock the device and scrolling down a page of text.

An issue with multi-touch functionality arises when water 115 (or more generally a liquid) is in contact with the touchscreen 110. When this occurs, the tablet 105 registers a touch because water is a conductive object. For example, as shown, water 115 on the touchscreen 110 may trigger multi-touch functionality as the user 100 is simultaneously touching the touchscreen 110. The multi-touch functionality may result in an unexpected zoom or page scroll. Additionally, a user 100 may swipe across the touchscreen 110, through the water 115, resulting in a streak 120 of water 115 across the screen. The streak 120 may leave a conductive trail that may further extend a scroll or zoom or simply register as touched regions after the user has completed the swipe with their finger. Thus, there is a need to eliminate false touches due to water on the touchscreen.

Figure 2:
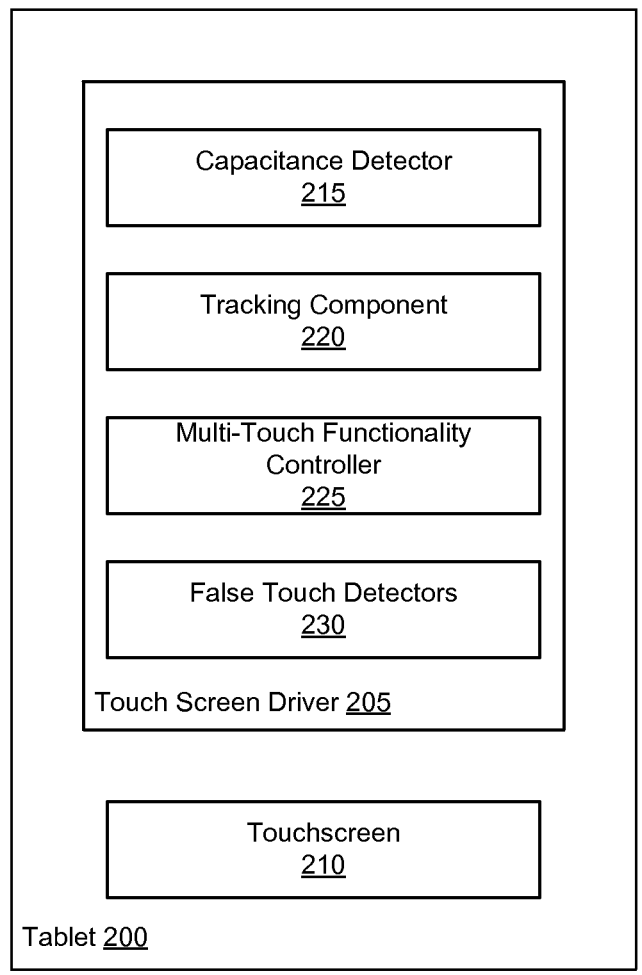
FIG. 2 is a block diagram illustrating a tablet, according to one embodiment disclosed herein.

FIG. 2 illustrates a block diagram illustrating a tablet 200 configured to identify false touches triggering a multi-touch sequence due to water, according to one embodiment. As shown, the tablet 200 includes a touchscreen driver 205 and a touchscreen 210. The touchscreen driver 205 includes a capacitance detector 215, a tracking component 220, a multi-touch functionality controller 225, and false touch detector 230. The capacitance detector 215 is configured to detect when a touch occurs. A user's finger, stylus, water, or some other conductive object triggers a touch on the touchscreen 210 by creating a capacitance between sensors embedded in the touchscreen 210 and the conductive object. The capacitance detector 215 detects the capacitance created between the conductive object and the touchscreen 210. The tracking component 220 identifies the location of a touch on the touchscreen 210 based on the changes in capacitance identified by the capacitance detector 215. The tracking component 220 provides the coordinates for a given touch detected by the capacitance detector 215. For example, given a touchscreen 210 having sensors in a 4×4 (row× column) arrangement, the tracking component 220 provides a touch detected by the capacitance detector 215 occurs at sensor location (1,2), i.e. one sensor across and two sensors down in the 4×4 arrangement. Additionally, the tracking component 220 may provide more general information such as the region of the touchscreen 210 in which a touch was detected by the capacitance detector 215. For example, building on the 4×4 sensor arrangement above, the touchscreen 210 may additionally be split into four quadrants such that the tracking component 220 will register the touch occurring at Location (1,2) and that the touch occurred in the first quadrant of the touchscreen 210.

A limitation of the capacitance detector 215 and the tracking component 220, however, is that the capacitance detector 215 typically cannot discriminate between what is actually causing a change in capacitance. As used herein, an active touch generally refers to a touch by a user of the tablet 200. For example, an active touch may be a purposeful touch by the user on the touchscreen 210, an accidental touch by the user on the touchscreen 210, or a touch by a stylus on the touchscreen 210. In contrast, as used herein, a false touch generally refers to a touch that occurred by something other than the user. That is to unwanted capacitance caused by environmental (or other) factors. For example, a false touch may occur because of water on the screen. False touches may result in multi-touch functionality being triggered. Multi-touch functionality is the ability of the capacitance detector 215 to recognize more than one touch on the touchscreen 210. For example, multi-touch functionality allows a user to perform a variety of gestures, e.g., a double-tap on the touchscreen 210 with multiple fingers or to zoom in or out of a display by pinching or spreading fingers across the touch screen. The controller 225 can selectively disable multi-touch functionality, in cases where the false touch detector 230 determines that a multi-touch sequence has one or more touch components predicted to be the result of capacitance of a false touch (e.g., the presence of water).

Figure 3:
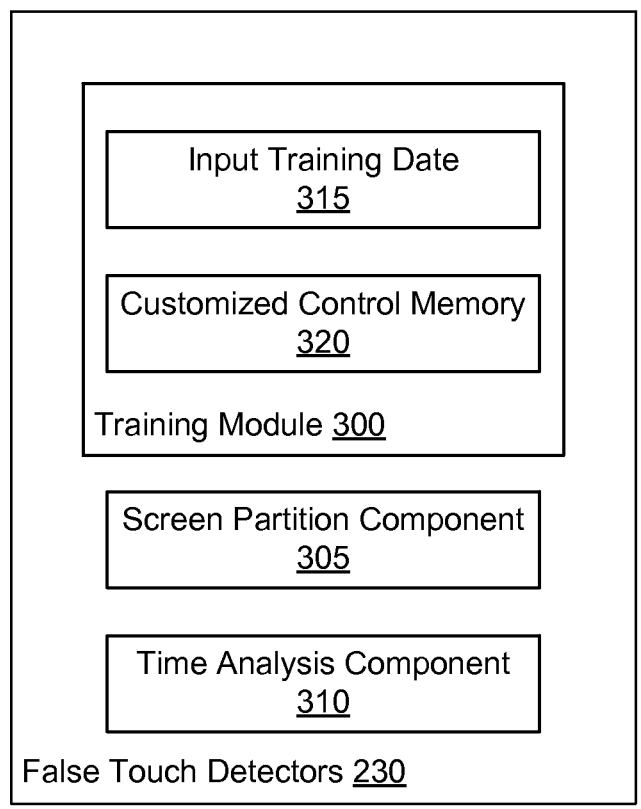
FIG. 3 illustrates a false touch detector configured to detect false touches on the tablet, according to one embodiment disclosed herein.

The false touch detector 230 aids in discriminating between an active touch and a false touch. For example, the false touch detector 230 can communicate with the multi-touch functionality controller 225 to confirm whether a touch is a false touch. FIG. 3 illustrates a block diagram of the false touch detector 230. The false touch detector 230 includes a training module 300, a screen partition component 305, and a time analysis component 310.

The training module 300 allows the user to put the tablet in a training mode so that the tablet may learn patterns of how a user interacts with the touchscreen 210. The training module 300 may include input training data 315, control memory 320, and a timer 325. The input training data 315 includes the data gathered by the training module 300 while the tablet 200 is in training mode. For example, the input training data 315 may include the user's handedness or regions on the touchscreen 210 the user is likely to scroll or let a finger rest while the user is scrolling through text. The training module 300 gathers the input training data 315 by using capacitance detector 215, the tracking component 220, and the timer 325. The capacitance detector 215 records whether a touch occurs. The tracking component 220 provides the locational data of where the recorded touch occurred. The timer 325 provides the temporal data regarding the duration of the recorded touch. Collectively, the input training data 315 results in an array of values showing where on the tablet 200 the user is most likely to be touching and the duration of that touch. For example, a user may only average a touch time of one second in the middle of the touchscreen 210. Thus, when capacitance detector 215 registers a touch in a multi-touch instruction sequence in excess of one second in the middle of the touchscreen 210, the touch may trigger the multi-touch functionality controller 225 to disable the multi-touch functionality for that multi-touch instruction sequence. The user may also store customized touch commands in the customized control memory 320. The user can indicate regions of the touchscreen 210 where the user knows they are likely to be causing a false touch and marking off the regions where the user wants touches to be ignored. For example, the user may mark off the bottom region of the screen because the user often rests the screen on their stomach.

The screen partition component 305 works with the capacitance detector 215 and the tracking component 220 to discriminate between an active touch and a false touch in a multi-touch instruction sequence. The screen partition component 305 recognizes the screen or page the user is currently using and partitions the screen into locations where the user is more likely and less likely to actively touch. The tracking component 220 allows the screen partition component 305 to determine whether the touch occurred in a region of the screen the touch is expected. For example, if the user is using a reader application on the tablet, the screen partition component 305 may partition the touchscreen 210 into active regions, such as the forward and back page buttons, and less active or passive regions, such as the remainder of the screen. The tablet is more likely to detect an active touch in a region of the screen, such as where the forward and back page buttons are located or where the text is located, if the user is scrolling or zooming on the text.

The time analysis component 310 works with the capacitance detector 215 and the tracking component 220 to discriminate between an active touch and a false touch in a multi-touch instruction sequence. The time analysis component 310 uses a timer to record the length of time that the capacitance detector 215 detects capacitance from a touch. The user may set a threshold value of time for comparison. For example, when the capacitance detector 215 detects a touch, the timer in the time analysis component 310 records the duration of the touch. The time analysis component 310 then takes the recordation and compares it to the threshold value of time for analysis.

Figure 4:
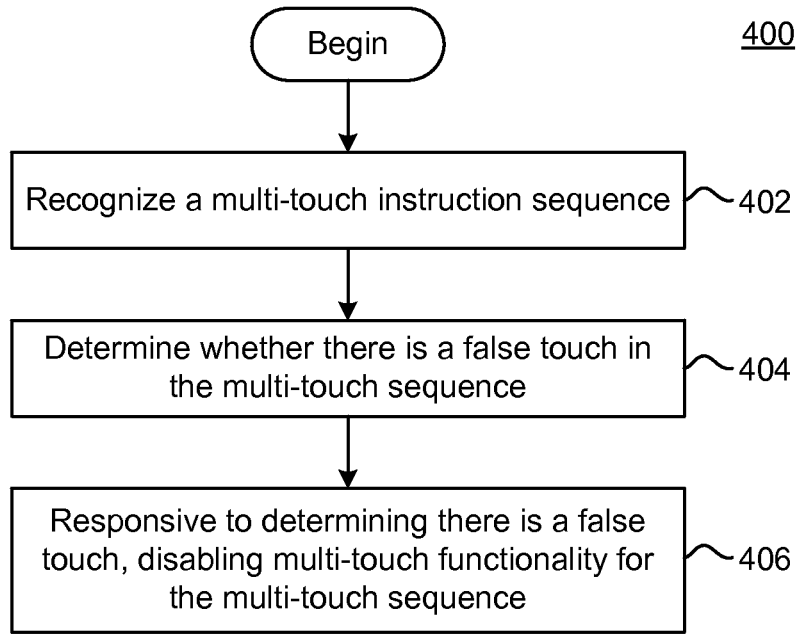
FIG. 4 illustrates a method for discriminating between active and false touches in a multi-touch instruction sequence, according to one embodiment disclosed herein.

FIG. 4 illustrates a general method 400 of discriminating between an active touch and a false touch on a touchscreen using the false touch detector 230, according to one embodiment of the invention. At step 402, the capacitance detector 215 detects a multi-touch instruction sequence. At step 404, the false touch detector 230 determines whether there is a false touch in the multi-touch sequence. At step 406, responsive to the false touch detector 230 determining that there is a false touch in the multi-touch instruction sequence, the multi-touch functionality controller 225 disables multi-touch functionality for the detected multi-touch instruction sequence.

Figure 5:
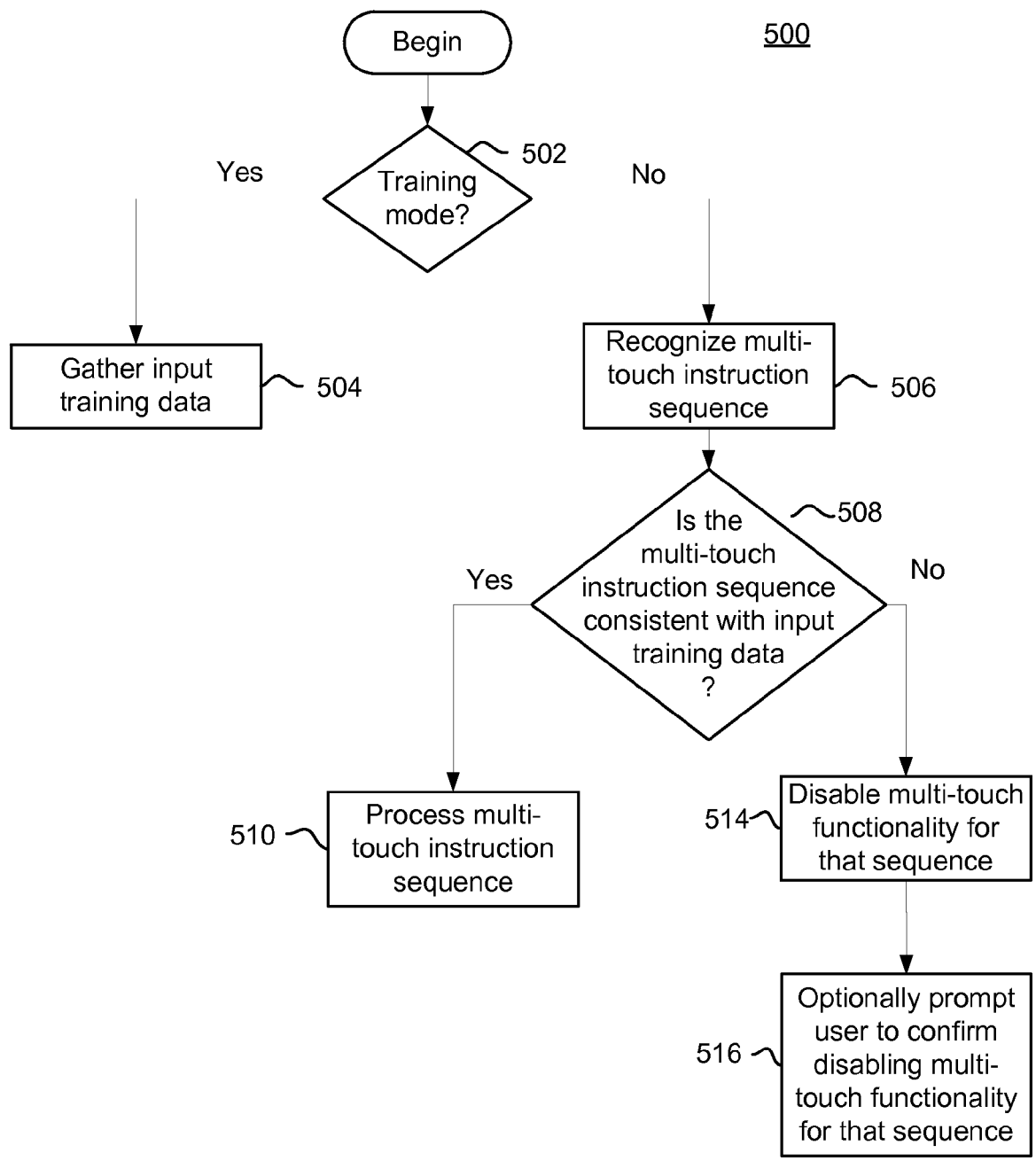
FIG. 5 illustrates a method for determining a whether a false touch is present in a multi-touch instruction sequence, according to one embodiment disclosed herein.

FIG. 5 illustrates a method 500 of using the training module 300 to detect false touches on the tablet 200, according to one embodiment. The method 500 begins at decision block 502. At decision block 502, the tablet 200 determines whether it is in training mode. If the tablet 200 is in training mode, the tablet 200 gathers input training data 315 at step 504. Optionally, the user may provide customized touch commands to the customized control memory 320. If the tablet 200 is not in training mode, then the tablet will use the input training data 315 and the customized control memory 320 to discriminate between an active touch and a false touch. At step 506, the capacitance detector 215 recognizes a multi-instruction sequence. At decision block 508, the tablet 200 determines whether the multi-touch instruction sequence is consistent with the data generated in training mode by the training module 300. At step 510, if the multi-touch instruction sequence is consistent with the data gathered in the training mode, the tablet 200 processes the multi-touch instruction sequence. If, however, the multi-touch instruction sequence is inconsistent with the data gathered in training mode, at step 512 the multi-touch functionality controller 225 disables multi-touch functionality for that multi-touch instruction sequence. Optionally, at step 514, the tablet 200 may prompt the user to confirm that the multi-touch instruction sequence is the result of a false touch. At step 514, the user has the ability to override the multi-touch functionality controller 225 and leave multi-touch functionality enabled for the multi-touch instruction sequence.

Figure 6:
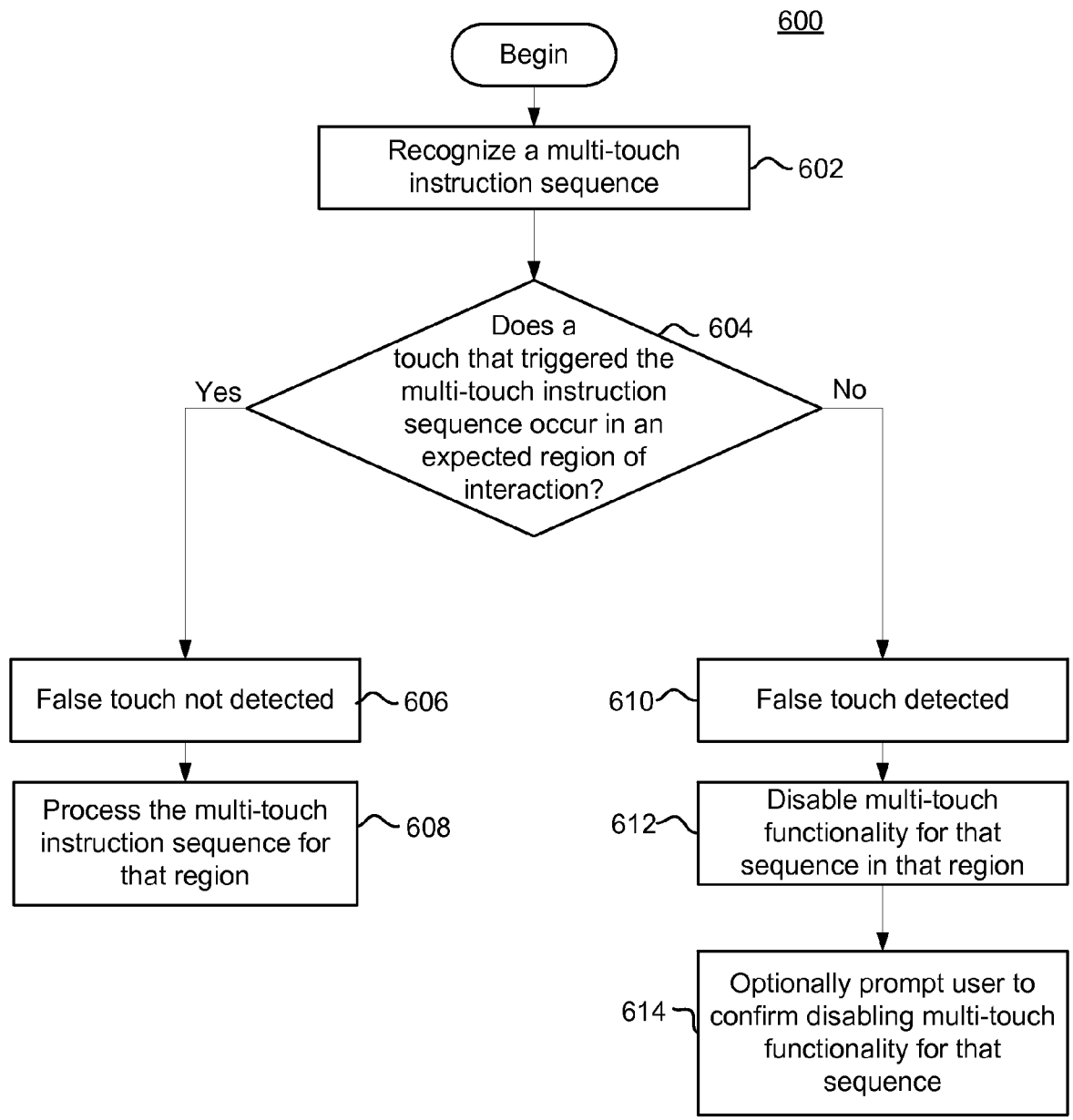
FIG. 6 illustrates a method for determining whether there is a false touch in the multi-touch instruction sequence, according to one embodiment disclosed herein.

FIG. 6 illustrates a method 600 of using the screen partition component 305 to detect false touches on the tablet 200, according to one embodiment. At step 602, the capacitance detector 215 recognizes a multi-touch instruction sequence. At decision block 604, the screen partition component 305 determines whether a touch that triggered the multi-touch instruction sequence occurs in an expected region of interaction. If the screen partition component 305 determines that the touch that triggered the multi-touch instruction sequence occurred in an expected region of interaction, at step 606 a false touch is not detected. Because a false touch was not detected, at step 608 the multi-touch instruction sequence for that region is processed. If, however, the screen partition component 305 determines that the touch that triggered the multi-touch instruction sequence did not occur in an expected region of interaction, then at step 610 a false touch is detected. At step 612, because the false touch is detected, the multi-touch functionality controller 225 disables multi-touch functionality for the multi-touch instruction sequence in that region. Optionally, at step 614, the tablet 200 may prompt the user to confirm that the multi-touch instruction sequence is the result of a false touch. At step 614, the user has the ability to override the multi-touch functionality controller 225 and leave multi-touch functionality enabled for the detected multi-touch instruction sequence.

The false touch detector 230 further includes a time analysis component 310. The time analysis component 310 works with the capacitance detector 215 and the tracking component 220 to discriminate between an active touch and a false touch in a multi-touch instruction sequence. The time analysis component 310 uses a timer to record the length of time that the capacitance detector 215 detects capacitance from a touch. The user may set a threshold value of time for comparison. For example, when the capacitance detector 215 detects a touch, the timer in the time analysis component 310 records the duration of the touch. The time analysis component 310 then takes the recordation and compares it to the threshold value of time for analysis.

Figure 7:
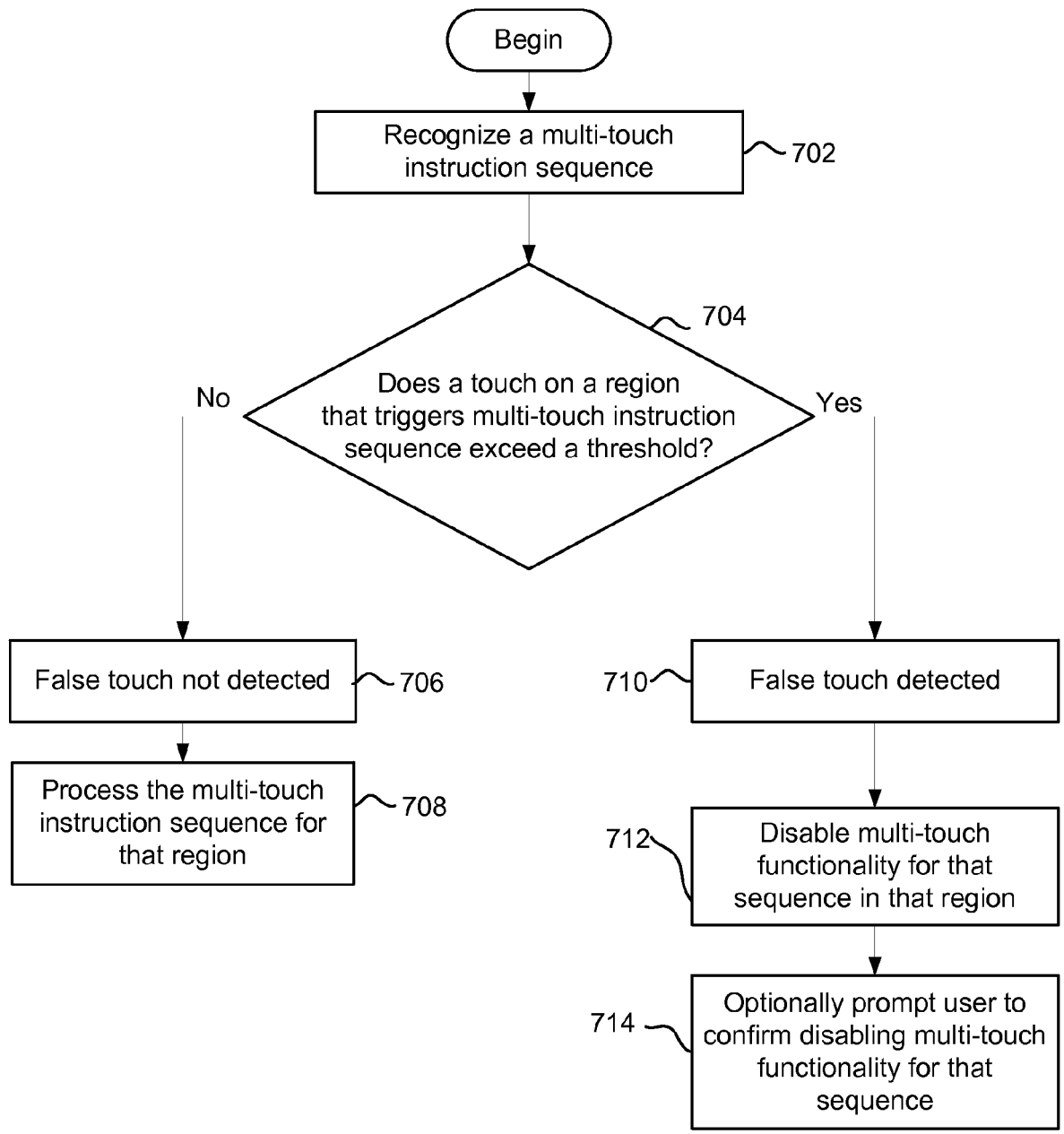
FIG. 7 illustrates a method for determining whether there is a false touch in the multi-touch instruction sequence, according to one embodiment disclosed herein.

FIG. 7 illustrates a method 700 of using the time analysis component 310 to detect false touches on the tablet 200, according to one embodiment. At step 702, the capacitance detector 215 recognizes a multi-instruction sequence. At decision block 704, the time analysis component 310 determines whether a touch that triggered multi-touch functionality exceeds a threshold value of time for that region. If the time analysis component 310 determined that the touch that triggered multi-touch functionality exceeds the threshold value of time for that region, then at step 710, the time analysis component 310 registers a false touch. Because the time analysis component 310 registered a false touch, at step 712 the multi-touch functionality controller 225 disables multi-touch functionality for the multi-touch instruction sequence in that region. Optionally, at step 714, the tablet 200 may prompt the user to confirm that the multi-touch instruction sequence is the result of a false touch. At step 714, the user has the ability to override the multi-touch functionality controller 225 and leave multi-touch functionality enabled for the multi-touch instruction sequence. If, however, the time analysis component 310 determines that the touch that triggered multi-touch functionality does not exceed a threshold time limit for that region, at step 706 a false touch is not detected. Because a false touch was not detected, at step 708 the multi-touch instruction sequence for that region is processed.

Figure 8:
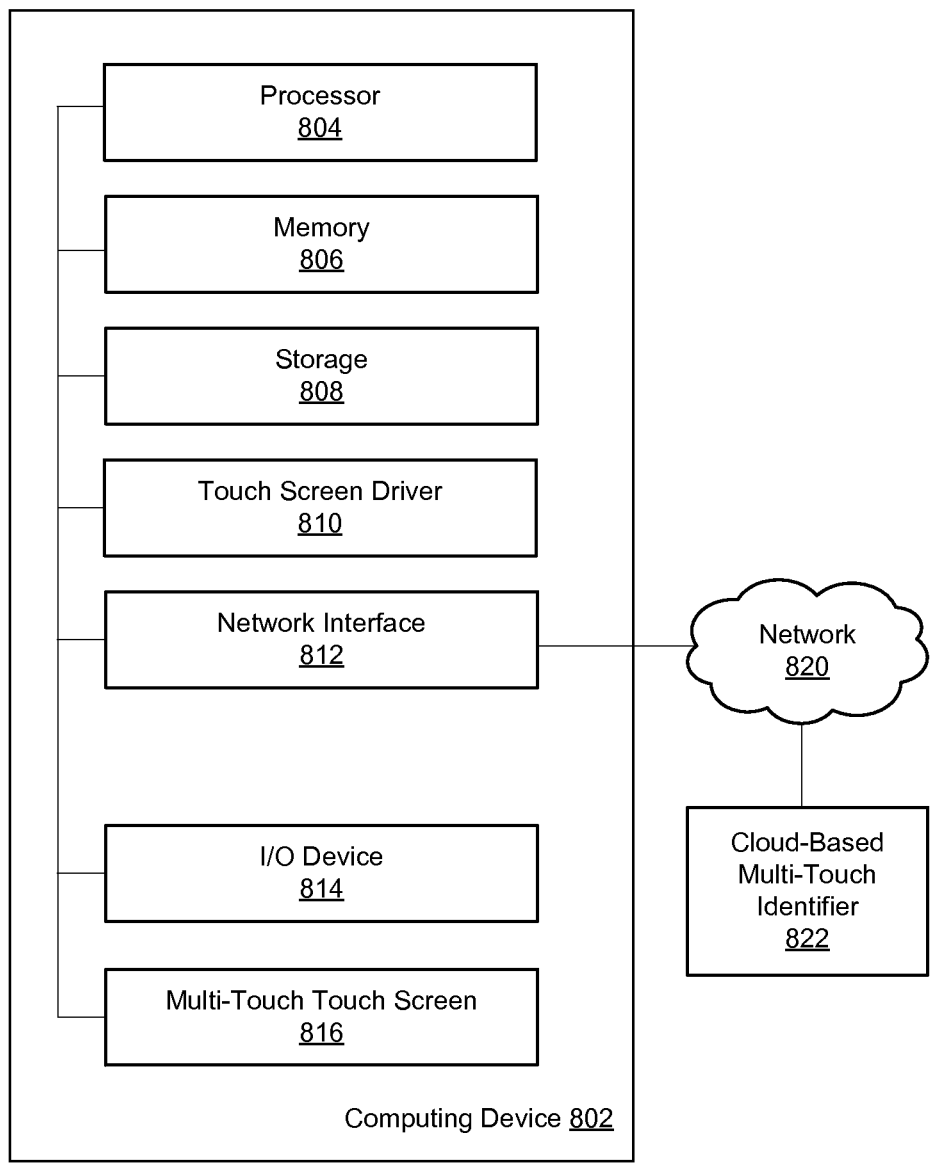
FIG. 8 illustrates an example of a computing server, according to one embodiment disclosed herein.

FIG. 8 illustrates an example computing system 800, according to one embodiment. As shown, the computing system 800 includes a central processing unit (CPU) 804, a memory 806, storage 808, a touchscreen driver 810, and a network interface 812, each connected to a bus 818. The computing system 800 also includes an I/O device 814 (e.g., keyboard and mouse devices) and a multi-touch touchscreen 816, both connected to the computing system 800. Further, in context of this disclosure, the computing elements shown in the computing system 800 may correspond to a physical computing system (e.g., a system in a date center) or may be a virtual computing instance when executing within a computing cloud.

The CPU 804 retrieves and executes programming instructions stored in the memory 806 as well as stores and retrieves application data residing in the memory 806. The bus 818 is used to transmit programming instructions and application data between the CPU 804, memory 806, storage 808, touchscreen driver 810, network interface 812, I/O device 814, and multi-touch touchscreen 816. Note, CPU 804 is included to be representative of a single CPU, multiple CPUs, a single CPU having multiple processing cores, and the like. The memory 806 is generally included to be representative of a random access memory. The storage 808 may be a disk drive storage device. Although shown as a single unit, the storage 808 may be a combination of a fixed and/or removable storage devices, such as fixed disc drives, removable memory cards, optical storage, network attached storage (NAS), or storage-area-network (SAN).

The touchscreen driver 810 is configured to facilitate communication between the multi-touch touchscreen 8160 and the CPU 804. When a touch is registered on the multi-touch touchscreen 816, the touchscreen driver 810 relays this information to the CPU 804. Additionally, the touchscreen driver 810 may facilitate discriminating between an active touch and a false touch on the multi-touch touchscreen 816.

A network 820 facilitates communication between a cloud-based false touch identifier 822 and the network interface 812. The cloud-based false touch identifier 822 discriminates between an active touch and a false touch at a cloud-based level, and transmits this information to the CPU 804 similar to the touchscreen driver 810.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications such as the cloud-based false touch identifier 822 or related data available in the cloud. For example, the cloud-based false touch identifier 822 could execute on a computing system in the cloud and discriminate between active touches and false touches. In such a case, the cloud-based false touch identifier 822 could discriminate between active touches and false touches and transmit this information to the CPU 804. Additionally, the cloud-based false touch identifier 822 could store input training date and customized control memory 320 at a storage location in the cloud to be accessed later by the CPU 804. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of detecting a false touch on a touchscreen, comprising:
   recognizing a multi-touch instruction sequence;
   determining that the multi-touch instruction sequence includes at least a first touch input corresponding to a false touch and a second touch input corresponding to an active touch, wherein the active touch is caused by a user, and wherein the false touch is caused by an entity other than the user;
   in response to determining that the first touch input corresponds to the false touch, selectively filtering out the first touch input within the multi-touch instruction sequence determined to correspond to the false touch; and
   processing the second touch input within the multi-touch instruction sequence as a single-touch instruction.

2. The method of claim 1, further comprising:
   prompting the user to verify that the false touch occurred.

3. The method of claim 1, wherein determining that the first touch input corresponds to the false touch further comprises:
   determining whether the multi-touch instruction sequences is consistent with input training data generated by a training module.

4. The method of claim 1, wherein determining that the first touch input corresponds to the false touch further comprises:
   determining whether a touch that triggered the multi-touch instruction sequence occurs in an expected region of interaction.

5. The method of claim 1, wherein determining that the first touch input corresponds to the false touch further comprises:
   determining whether a touch that triggered the multi-touch instruction sequence exceeds a threshold time.

6. The method of claim 1, wherein selectively filtering one or more touch inputs comprises:
   disabling multi-touch functionality for the multi-touch instruction sequence in a region of the touchscreen the multi-touch instruction sequence was detected.

7. The method of claim 6, wherein a touchscreen controller disables multi-touch functionality for the multi-touch instruction sequence.

8. A system, comprising:
   a processor; and
   a memory storing program code, which, when executed by the processor performs an operation for detecting a false touch on a touch screen, the operation comprising:
   recognizing a multi-touch instruction sequence;
   determining that the multi-touch instruction sequence includes at least a first touch input corresponding to a false touch and a second touch input corresponding to an active touch, wherein the active touch is caused by a user, and wherein the false touch is caused by an entity other than the user;
   in response to determining that the first touch corresponds to the false touch, selectively filtering out the first touch input within the multi-touch instruction sequence determined to correspond to the false touch; and
   processing the second touch input within the multi-touch instruction sequence as a single-touch instruction.

9. The system of claim 8, further comprising:
   prompting the user to verify that the false touch occurred.

10. The system of claim 8, wherein determining that the multi-touch instruction sequence includes at least a first touch input corresponding to a false touch, comprises:
    determining whether the multi-touch instruction sequences is consistent with input training data generated by a training module.

11. The system of claim 8, wherein determining that the multi-touch instruction sequence includes at least a first touch input corresponding to a false touch, comprises:
    determining whether a touch that triggered the multi-touch instruction sequence occurs in an expected region of interaction.

12. The system of claim 8, wherein determining that the multi-touch instruction sequence includes at least a first touch input corresponding to a false touch, comprises:
   determining whether a touch that triggered the multi-touch instruction sequence exceeds a threshold time.

13. The system of claim 8, wherein selectively filtering one or more touch inputs, comprises:
   disabling multi-touch functionality for the multi-touch instruction sequence in a region of the touchscreen the multi-touch instruction sequence was detected.

14. The system of claim 13, wherein a touchscreen controller disables multi-touch functionality for the multi-touch instruction sequence.

15. A computer program product for detecting a false touch on a touch screen, the computer product comprising:
   a non-transitory computer-readable storage medium having computer-readable program code embodied therewith, the computer-readable program code comprising:
   computer-readable program code configured to recognize a multi-touch instruction sequence;
   computer-readable program code configured to determine that the multi-touch instruction sequence includes at least a first touch and a second touch input corresponding to an active touch, wherein the active touch is caused by a user, and wherein the false touch is caused by an entity other than the user;
   computer-readable program code configured to selectively filter out the first touch input within the multi-touch instruction sequence determined to correspond to the false touch, responsive to determining that the first touch corresponds to the false touch; and
   computer-readable program code configured to process the second input within the multi-touch instruction sequence as a single touch instruction.

16. The non-transitory computer-readable storage medium of claim 15, further comprising:
   computer-readable program code configured to prompt the user to verify that the false touch occurred.

17. The non-transitory computer-readable storage medium of claim 15, wherein computer-readable program code configured to determine that the multi-touch instruction sequence includes at least the first touch input, comprises:
   computer-readable program code configured to determine whether the multi-touch instruction sequences is consistent with input training data generated by a training module.

18. The non-transitory computer-readable storage medium of claim 15, wherein computer-readable program code configured to determine that the multi-touch instruction sequence includes at least the first touch input, comprises:
   computer-readable program code configured to determine whether a touch that triggered the multi-touch instruction sequence occurs in an expected region of interaction.

19. The non-transitory computer-readable storage medium of claim 15, wherein computer-readable program code configured to determine that the multi-touch instruction sequence includes at least the first touch input, comprises:
   computer-readable program code configured to determine whether a touch that triggered the multi-touch instruction sequence exceeds a threshold time.

20. The non-transitory computer-readable storage medium of claim 15 wherein computer-readable program code configured to selectively filter the first touch input comprises:
   computer-readable program code configured to disable multi-touch functionality for the multi-touch instruction sequence in a region of the touchscreen the multi-touch instruction sequence was detected.

* * * * *